United States Patent [19]

Zückert

[11] 4,333,864
[45] Jun. 8, 1982

[54] PROCESS FOR PRODUCING IMPROVED ALKYD RESIN EMULSIONS

[75] Inventor: Bertram Zückert, Graz, Austria

[73] Assignee: Vianova Kunstharz, A.G., Werndorf, Austria

[21] Appl. No.: 201,345

[22] Filed: Oct. 27, 1980

[30] Foreign Application Priority Data

Oct. 29, 1979 [AT] Austria .................................. 6965/79

[51] Int. Cl.$^3$ ............................................ C08L 33/02
[52] U.S. Cl. .................................................. 525/501.5
[58] Field of Search ............................ 260/19 UA, 20

[56] References Cited

U.S. PATENT DOCUMENTS

| 3,697,461 | 10/1972 | Troeger | 260/19 UA |
| 4,002,582 | 1/1977 | Fritsche | 260/19 UA |
| 4,008,140 | 2/1977 | Fritsche | 260/19 UA |
| 4,229,331 | 10/1980 | Zuckert | 260/20 |

Primary Examiner—Paul R. Michl
Attorney, Agent, or Firm—A. W. Breiner

[57] ABSTRACT

Improved air drying emulsions based on oil and phenol modified alkyd resins are described. The emulsions provide enhanced storage stability over long periods, primarily due to the introduction of carboxyl group containing copolymers. The enhanced storage stability is observable in the resins prior to incorporation into a paint formulation and in a paint formulation.

12 Claims, No Drawings

PROCESS FOR PRODUCING IMPROVED ALKYD RESIN EMULSIONS

The present invention is directed to a process for producing improved air drying emulsions based on oil- or phenol-modified alkyd resins and to the improved emulsions. More particularly, the invention is directed to air drying emulsions having enhanced storage stability.

According to U.S. patent application Ser. No. 966,867 filed Dec. 6, 1978 now U.S. Pat. No. 4,229,331, air drying alkyd resin emulsions are produced in a three-step process wherein first a polyethylene glycol (PEG) with an average molecular weight of from 500 and 5000 is etherified with a low molecular alkyl phenol resol and the obtained condensate is reacted with a drying oil. This reaction product is used as a starting material for the preparation of alkyd resins or oleo-resinous binders which can be processed further to provide aqueous emulsions with excellent performance characteristics. The emulsions prepared according to the aforementioned application show, in comparison with the PEG-modified resins prepared in known manner, considerably improved stability characteristics and, with regard to drying speed, water resistance and corrosion resistance of the films, are about equal in performance to normal alkyd resins dissolved in organic solvents. When using the methods known in the art where the PEG is introduced through esterification only, a comparable stability of the emulsion is obtained only by sacrificing drying speed and film resistance through the increase of the PEG level in the resin.

Despite the very good characteristics of the products of the afore-mentioned application Ser. No. 966,867, it has been shown that for the main end use of such alkyd resin emulsions, i.e., domestic maintenance paints (trade paints), particularly for do-it-yourself uses, the stability of the products is still not satisfactory. With a storage of one year—a period which is easily reached in having the product go from the producer to the consumer—and with storage temperatures of over 25° C., often prevailing in moderate climate zones, unless cooling is applied, these emulsions are subject to severe changes. Thus, although at normal temperatures the described emulsions survive one year without precipitation, they become more liquid with passage of time. Depending on the conditions of measurement, the decline in viscosity may reach up to 90% of the initial value. Higher temperatures promote this process. Notwithstanding that the most important paint characteristics, such as drying and film quality are not adversely affected by this change, numerous problems arise in the final use of the paints. Thus, there is a real demand for a further improvement in the storage stability of the alkyd resin emulsions.

The unsatisfactory storage stability of the emulsions prepared according to U.S. application Ser. No. 966,867 over extended periods is believed to be due to the poor resistance to saponification of the chain end acid semi-ester groups. These groups are formed through semi-esterification of dicarboxylic acids (mainly phthalic anhydride). The carboxy groups, upon neutralization with amines, effect the necessary negative charge of the emulsion drops. When they are split off, the emulsion first becomes more coarse with lower viscosity until finally breaking down.

It is known from literature that the resistance to saponification of acidic semi-ester groups increases with the distance of the carboxy group to the ester group, i.e., with the size of the intermediate alkyl group (see E. T. Turpin, J.P.T., Vol. 47, No. 602, 1975, pages 40–46). Therefore, efforts have been made to obtain more stable emulsions by using addition compounds of acrylic or methacrylic acid to unsaturated fatty acids for the introduction of the acid groups. According to DE-OS (German Offenlegungsschrift) No. 24 16 658, adducts are produced at 250°–300° C. by reacting acrylic acid or methacrylic acid with conjugated unsaturated fatty acids, which subsequently are processed through esterification to PEG-modified water-emulsifiable alkyd resins according to known methods. The disadvantages of the latter-described process are that PEG is introduced through esterification and, thus, can easily be split off again. In order to obtain sufficient stability of the emulsion, quite a great quantity of PEG has to be employed, i.e., from 5–15%, with the examples illustrating from 8.5 to 9.5%. Furthermore, with the stated conditions, adducts with a maximum of 15% of acrylic acid result; while from 17–47% of the employed acrylic or methacrylic acid remain unreacted and have to be removed by distillation. For an acid value of about 20, considered necessary for sufficient stabilization of the emulsion, at least 14.6% of fatty acids are required for the adduct formation with the required 2.58% of acrylic acid. Since water-dilutable air drying alkyd resins normally have a fatty acid level of from 30 to 40%, this quantity is about half of the fatty acids present. This amount of fatty acid has to be considered as lost for film formation by crosslinking, since, owing to the high reaction temperatures at the preparation of the intermediate products, those double bonds are lost by dimerization which are not blocked through adduct formation.

From the above explanation of the relatively poor drying of the products prepared according to German Offenlegungsschrift No. 24 16 658, it will be apparent that if this method were to be combined with the process of U.S. application Ser. No. 966,867, the obtained emulsions would have good stability, but further reduced drying and crosslinking in the film. Additionally, those double bonds which react with the PEG-modified alkyl phenol resin would be lost in addition to the ones blocked by adduct formation and dimerization.

The present invention is to a process avoiding the described disadvantages while permitting the preparation of stable alkyd resin emulsions with good drying and film characteristics, the anionic stabilization being effected through the use of copolymers carrying the carboxy groups.

The present invention is thus concerned with a process for producing water-emulsifiable air drying paint binders, on the basis of modified alkyd resins with a fatty acid content of from 15 to 50% by weight and a polyethylene glycol content of from 3 to 8%, which are obtained through condensation of a polyethylene glycol with an average molecular weight of between 500 and 5000, and a low molecular alkyl- and/or arylphenol resol and an oil fatty acid ester with an iodine number of at least 125, and through reaction of the condensate with mono- and dicarboxylic acids and the normally used alcohol components. The process is characterized in that—

50–92% by weight of a polyethylene glycol-resol-modified alkyd resin intermediate with an acid value of below 15, preferably below 5 mg KOH/g, an intrinsic viscosity of from 4 to 8 ml/g (chloroform/20° C.), and a hydroxyl number of from 50 to 250 mg KOH/g, and 8–50% by weight of a polymer, obtained through free radical polymerization at 80° to 140° C., preferably at from 90° to 110° C., of
6–40% by weight of methacrylic acid,
20–55% by weight of a drying oil fatty acid with an iodine number of at least 125, and
20–70% by weight of one or more vinyl- and/or vinylidene compounds, particularly acrylic compounds, containing no other reactive groups besides the double bond, are esterified at 170° to 200° C. to an acid value of from 10 to 30, preferably 15 to 25 mg KOH/g and an intrinsic viscosity of from 8 to 12 ml/g (chloroform/20° C.).

The modified alkyd resin thus obtained is emulsified in water upon neutralization of the carboxy groups with ammonia or organic amines. If desired, a maximum of 20% of organic auxiliary solvents can be utilized.

The alkyd resin intermediate is prepared according to U.S. application Ser. No. 966,867. Thus, in a first step, a polyethylene glycol with an average molecular weight of from 500 to 5000, preferably from 1000 to 3000 is etherified at from 100° to 160° C. with preferably an excess of a phenol resol. Optionally the reaction water may be eliminated faster by azeotropic entraining agents.

Suitable phenol resols, as described in Ser. No. 966,867 are alkali condensed products of mono-$C_3$–$C_9$-alkyl phenols and/or aryl phenols and formaldehyde, carrying an average of at least 1.5, preferably 1.8 methylol groups per molecule (minimum methlol functionality being 1.5). The alkyl phenols used are those with alkyl substituents with from 3 to 9 carbon atoms, such as p-isopropylphenol, butyl phenol, amyl phenol, octyl or nonyl phenol. The preferred phenols are p-tert. butyl phenol and cumyl phenol, particularly in mixture with alkyl phenols. As catalyst for the reaction between polyethylene glycol and the phenol condensate up to 5% by weight, of all raw materials used in this step, of an organic acid may be co-employed. Such suitable acids are unsaturated oil fatty acids, acrylic acid, fumaric acid, and the various isomers of phthalic acid.

The second reaction step, i.e., the reaction of the PEG-resol condensate with the unsaturated fatty acid esters, is carried out at 180° to 250° C. Suitable fatty acid esters are unsaturated oils with iodine numbers of above 125, and the substantially hydroxy-free esters of the fatty acids of such oils with polyols. Among them are the drying and semi-drying oils, such as linseed oil, soya oil, safflower oil, sunflower oil, dehydrated castor oil, and the esters of the unsaturated fatty acids of these oils, for example, with trimethylol ethane, trimethylol propane, pentaerythritol, neopentyl glycol, etc. Specially suited are those oils, the oil fatty acids of which have double bonds at least partially in conjugated position, such as China wood oil, oiticica oil, dehydrated castor oil, artificially isomerized oils, and artificial esters containing such fatty acids.

In a preferred embodiment, the first reaction step, i.e., the etherification of the polyethylene glycol with the resol, is carried out in the presence of the unsaturated oil fatty acid ester used for the second reaction step.

In the third reaction step, the reaction products, according to known methods, are reacted with the raw materials known to those skilled in the art to give the alkyd resin intermediates used in the present process. They are prepared through reesterification of the PEG-phenol-modified oil with polyalcohols and further esterification with polycarboxylic acids. Optionally, additional quantities of drying oils of the corresponding oil fatty acids and of cyclic or aromatic carboxylic acids may be co-employed.

The alkyd resin intermediates suitable for reaction with the copolymers according to the present invention have a fatty acid content of between 15 and 50%, an acid value of below 15, preferably below 5 mg KOH/g, a hydroxyl number of between 50 and 250 mg KOH/g, and an intrinsic viscosity of from 4 to 8 ml/g, measured in chloroform, at 20° C. It is evident that mixtures of alkyd resins answering to the required specifications may also be used. Furthermore, mixtures can be used of PEG-modified alkyd resins with PEG-free alkyd resins.

For introducing the carboxy groups necessary for the stabilization of the emulsions, polymers are used according to the present invention which are prepared by free radical polymerization of from 6 to 40% by weight of methacrylic acid, from 20 to 55% by weight of a drying oil fatty acid with a minimum iodine number of 125, and from 20 to 70% by weight of one or more vinyl and/or vinylidene compounds, particularly of acrylic compounds carrying no reactive groups besides the double bond.

The carboxy groups of methacrylic acid have tertiary configuration after polymerization and thus poor reactivity. They remain essentially unesterified during reaction between the alkyd and polymer, and function for stabilization of the emulsion upon neutralization. The primary carboxy groups of the fatty acids, on the other hand, react with the hydroxy groups of the alkyd resin intermediate and, thus, effect a mutual linking.

In the final product there are situated between the stabilizing carboxylate groups and the ester linkages the long hydrophobic alkyl chains of the fatty acids, highly aggravating or inhibiting hydrolytic separation.

The introduction of vinyl compounds and acrylic esters provides a means for monitoring the compatibility range and the emulsifying effect of the polymer. Thus, on the one hand, through regulation of the compatibility with the alkyd component, the introduction of the polymer is alleviated; on the other hand, an emulsifying effect is safeguarded in the event the polymer is not fully incorporated or is split off afterwards.

For the preparation of the copolymer drying oil fatty acids with conjugated double bonds, such as dehydrated castor oil fatty acids or isomerized fatty acids; or fatty acids with isolated double bonds, such as technical soya oil, safflower oil, or linseed oil fatty acids, are used. Since isolated unsaturated fatty acids have poor reactivity, they have to be employed in excess. If during the polymerization the fatty acid does not react completely, the remainder is incorporated during reaction with the alkyd component.

Suitable vinyl and vinylidene compounds are styrene, vinyl toluene, vinyl esters of acetic acid, propionic acid or versatic acid. Preferred are the available alkyl esters of acrylic and methacrylic acid. The selection is governed in principle by the compatibility with the alkyd resin intermediate. It is known to those skilled in the art that by judiciously selecting the monomers, drying speed and hardness of the paint film are influenced.

The polymerization is carried out in solution at 80° to 140° C., preferably 90° to 110° C. Initiators are radical formers splitting at these temperatures. Dibenzoyl peroxide is preferred. For limiting the molecular weight the normal chain transfer agents are used, such as tert. dodecylmercaptan. The end point of polymerization is reached when the non-volatile content of the reaction blend remains constant, meaning that the volatile monomers have substantially reacted. With the described conditions, side reactions are inhibited substantially, such as the dimerization of fatty acids. Thus, the fatty acids not entering the polymerization reaction remain unchanged and retain their oxidizing crosslinking capacity after their introduction into the alkyd resin.

Alkyd resin intermediate and polymer are combined such that, after complete esterification of the fatty acids at from 170° to 200° C., an acid value of from 10 to 30, preferably 15 to 25 mg KOH/g, and an intrinsic viscosity of from 8 to 12 ml/g, measured in chloroform at 20° C., result. The PEG-content of the modified alkyd resins prepared according to the invention ranges from 3 to 8% by weight.

The resins are diluted with a maximum of 20%, preferably from 5 to 15%, of organic auxiliary solvents and emulsified at between 40° to 80° C., in water containing a quantity of ammonia or organic amines corresponding to a neutralization of from 50 to 100% of the acid groups of the resin. Suitable auxiliary solvents are low molecular weight alcohols and ether alcohols, such as the alkanols with from 2 to 5 carbon atoms or ethylene glycolmonoalkyl ethers. The preferred neutralization agents are the tertiary amines, e.g., triethylamine or dimethylethanol amine.

The modified alkyd resins prepared according to the invention serve as basis for air drying water-dilutable paints which can be applied according to normal methods. Force drying at up to about 80° C. is also possible, as well as the formulation of stoving paints. In the latter case, small quantities of amine resins are added to the paint as additional crosslinker.

The following examples illustrate the invention without limiting its scope. All parts are by weight. The intrinsic viscosity is determined in chloroform at 20° C.

Preparation of the Alkyd Intermediates

The formulation of the alkyd resins is listed in Table 1.

TABLE 1

| | Alkyd Resin Intermediates | | | | | |
|---|---|---|---|---|---|---|
| | A 1 | A 2 | A 3 | A 4 | A 5 | A 6 |
| Part 1: | | | | | | |
| HÖ | 165 | 100 | — | — | 165 | 165 |
| LÖ | — | 70 | — | 100 | — | — |
| RÖ | — | — | — | 150 | — | — |
| ISFÖ | — | — | 180 | — | — | — |
| LÖFS | 10 | 10 | — | 20 | 10 | 10 |
| TÖFS | — | — | 10 | — | — | — |
| PÄG 1500 | 40 | — | 37 | 52 | 80 | — |
| PÄG 3000 | — | 30 | — | — | — | — |
| PÄG 600 | — | 10 | — | — | — | — |
| PR 1 | 45 | 40 | 25 | 35 | 50 | — |
| Part 2: | | | | | | |
| PER | 185 | 185 | 180 | 172 | 185 | 185 |
| pt-PBS | 180 | 185 | — | — | 180 | 180 |
| BS | 40 | — | 130 | 120 | — | — |
| LÖFS | — | — | — | 90 | 40 | 40 |
| TÖFS | — | 100 | 100 | — | — | — |
| Zn 8% | 0.8 | 0.8 | 0.8 | 0.8 | 0.8 | 0.8 |
| Part 3: | | | | | | |
| PSA | 130 | — | — | 145 | 130 | 130 |
| IPS | — | — | 133 | — | — | — |
| HA | — | 130 | — | — | — | — |
| THPSA | — | 88 | — | — | — | — |
| TPP/50 X | 0.6 | 0.6 | 0.6 | 0.6 | 0.6 | 0.6 |
| Total | 801.4 | 954.4 | 801.4 | 889.4 | 846.4 | 711.4 |
| —H$_2$O | 57.4 | 64.4 | 68.4 | 57.4 | 55.4 | 37.4 |
| resin, 100% | 744 | 890 | 733 | 832 | 791 | 674 |

Key For Table 1:
HÖ = China wood oil
LÖ = linseed oil
RÖ = dehydrated castor oil
ISFÖ = isomerized safflower oil
LÖFS = linseed oil fatty acid
TÖFS = tall oil fatty acid
PÄG 1500 = polyethyleneglycol ($\overline{M}$ ~1500)
PÄG 3000 = polyethyleneglycol ($\overline{M}$ ~3000)
PÄG 600 = polyethyleneglycol ($\overline{M}$ ~600)
PR 1: phenol resol of 1 mole of p-tert . butylphenol + 2 moles of formaldehyde
PER: pentaerythritol
pt-BSS: p . tert . butylbenzoic acid
BS: benzoic acid
Zn 8%: zincoctoate (8% zinc)
PSA: phthalic acid anhydride
IPS: isophthalic acid
HA: hexachloroendomethylenetetrahydrophthalic acid
THPSA: tetrahydrophthalic acid anhydride
TPP/50%: triphenylphosphite (50% xylol)

The preparation of resins A 1–A 5 is carried out according to the following method:

Part 1 is heated to 140° C. and held at this temperature for 60 minutes. Then the temperature is raised to 200° C. within 75 minutes and held for 90 minutes. Then Part 2 is added, the temperature is raised to 245° C. and held for 75 minutes. After cooling to 200° C., Part 3 is added and esterified at 190° C., using xylol as entraining agent, until an acid value of below 5 mg KOH/g is obtained.

For the PEG-free alkyd resin intermediate A 6, Parts 1 and 2 are mixed and heated to 245° C. Then the process as defined for A 1–A 5 is adopted.

The constants of the resins are listed in Table 2.

TABLE 2

| | Constants Of The Alkyd Resins | | | | | |
|---|---|---|---|---|---|---|
| Alkyd Resin | A 1 | A 2 | A 3 | A 4 | A 5 | A 6 |
| Fatty acid content (%) | 22.4 | 31 | 38 | 42 | 21 | 25 |
| Hydroxyl number (mg KOH/g) | 179 | 145 | 171 | 124 | 163 | 185 |
| Acid number (mg KOH/g) | 5.9 | 4.1 | 3.2 | 2.9 | 3.3 | 4.9 |
| Intrinsic viscosity (chloroform/20° C.) (ml/g) | 6.5 | 6.1 | 5.8 | 6.7 | 6.9 | 5.9 |

Preparation Of The Polymers

The formulation of polymers P 1 to P 4 is listed in Table 3.

TABLE 3

| | Polymers | | | |
|---|---|---|---|---|
| | P 1 | P 2 | P 3 | P 4 |
| Part 1: | 60 LÖFS | 45 X | 50 LOFS | 20 ROFS |
| | 45 X | 45 IP | 90 X | 35 X |
| | 45 IP | | | 35 IP |
| | 8 IBMA | | | |
| | 6 Vt | | | |
| | 6 MA | | | |
| | 3 DBP | | | |
| | 0.2 DM | | | |
| Part 2: | 32 IBMA | 40 IBMA | 20 BA | 30 2 ÄHA |
| | 24 Vt | 30 Vt | 65 Vt | 30 Vt |
| | 24 MA | 30 MA | 15 MA | 40 MA |

TABLE 3-continued

| | Polymers | | | |
|---|---|---|---|---|
| | P 1 | P 2 | P 3 | P 4 |
| Part 3: | 0.8 DM | 1 DM | 1 DM | 1 DM |
| | 40 LÖFS | 40 RÖFS | 20 RÖFS | 10 RÖFS |
| | 5 X | 5 X | 16 X | 10 X |
| | 5 IP | 5 IP | 14 DBP | 5 IP |
| | 11 DBP | 10 DBP | | 10 DBP |
| Total | 315 | 251 | 291 | 226 |

Key For Table 3:
LÖFS = linseed oil fatty acids
RÖFS = dehydrated castor oil fatty acids
X = xylol
IP = isopropanol
IBMA = isobutylmethacrylate
2 ÄHA = 2-ethylhexylacrylate
Vt = vinyltoluene
BA = n-butylacrylate
MA = methacrylic acid
DM = dodecylmercaptan
DBP = dibenzoylperoxide, 50%

Polymers P 1–P 4 are prepared as follows:

Part 1 is charged to the reaction vessel and heated to boiling temperature for P 1, P 2, and P 4 (about 90° C.), and to 110° C. for P 3. Then, the temperature being maintained, Parts 2 and 3 are added simultaneously and continuously over a period of 5 hours. The temperature is held until the determination of the non-volatile content gives values for the total polymerization corresponding to the volatile monomers.

TABLE 4

| | Constants Of The Polymers | | | |
|---|---|---|---|---|
| Polymers | P 1 | P 2 | P 3 | P 4 |
| Fatty acid content (%) | 50 | 28.5 | 41 | 23 |
| Methacrylic acid content (%) | 15 | 21.5 | 8.8 | 31 |
| Non-volatile (%) | 65.1 | 60 | 59.7 | 59.1 |
| Acid value (mg KOH/g) | 186 | 194 | 133 | 239 |
| Intrinsic viscosity (ml/g) (dimethylformamide, 20° C.) | 5.2 | 8.6 | 6.7 | 8.1 |

EXAMPLES 1–5

The alkyd resin intermediates are blended with the polymers in the ratios given in Table 5 and heated to 180° C., the solvents being distilled off completely toward the end by vacuum-stripping. For accelerating the esterification, small quantities of xylol may be added as an azeotropic entraining agent. At the end of the reaction, the entraining agent is removed by vacuum distillation.

The resins are diluted to 90% solids with ethylene glycol monobutylether and emulsified in water, at 50° to 60° C., with the addition of triethylamine, in order that the pH-value of the emulsion ranges between 8.5 to 9.5; and the viscosity, measured at 20° C. with a Brookfield rotation viscosimeter, RVF, Spindle No. 7, with 4 r.p.m., lies between 1500 and 3000 m Pa.s.

TABLE 5

| | Composition+ And Constants Of The Modified Alkyd Resins Of The Invention | | | | |
|---|---|---|---|---|---|
| Example | 1 | 2 | 3 | 4 | 5 |
| Alkyd resin A 1 | 80 | — | — | — | — |
| Alkyd resin A 2 | — | 90 | — | — | — |
| Alkyd resin A 3 | — | — | 85 | — | — |
| Alkyd resin A 4 | — | — | — | 65 | — |
| Alkyd resin A 5 | — | — | — | — | 55 |
| Alkyd resin A 6 | — | — | — | — | 25 |
| Polymer P 1 | 20 | — | — | — | 20 |
| Polymer P 2 | — | — | 15 | — | — |
| Polymer P 3 | — | — | — | 35 | — |
| Polymer P 4 | — | 10 | — | — | — |
| PEG-content (%) | 4.3 | 4.05 | 4.3 | 4.05 | 5.6 |
| Acid value (mg KOH/g) | 17.3 | 20.5 | 19.8 | 18.1 | 18.4 |
| Intrinsic viscosity (chloroform/20° C., ml/g) | 9.5 | 8.9 | 9.8 | 10.2 | 9.7 |

+The figures refer to 100% resin solids.

TABLE 6

| | Constants Of The Emulsions | | | | |
|---|---|---|---|---|---|
| Example | 1 | 2 | 3 | 4 | 5 |
| Non-volatile (%) | 41.5 | 40 | 39.9 | 42 | 41.1 |
| Viscosity (m Pa s) Brookfield RVF+ | 2450 | 2100 | 2000 | 2500 | 2400 |
| pH-value | 9.1 | 9.0 | 9.3 | 9.5 | 8.9 |

+Measured at 20° C. with Spindle No. 7, 4 r.p.m.

COMPARISON EXAMPLES A AND B

In order to establish the unexpected advantage over the state of the art, an emulsion was prepared according to each of U.S. application Ser. No. 966,867, A 1, and DE-OS No. 24 16 658.

Comparison Example A is an emulsion prepared according to U.S. application Ser. No. 966,867 A 1, Example 1, having a non-volatile content of 40.5% and a viscosity (Brookfield RVF, Spindle No. 7, 4 r.p.m., 20° C.) of 2050 m Pa.s.

Comparison Example B is an emulsion prepared according to Deutsche Offenlegungsschrift DE-OS No. 24 16 658, Example 2. However, not in conformity with the patent, prior to emulsifying, the resin was diluted to 90% with ethylene glycol monobutyl ether. The solvent is added in order to alleviate emulsifying and paint preparation, and was necessary for creating conditions for comparison for all examples. The emulsion had a non-volatile content of 51.5% and a viscosity of 1750 m Pa.s (Brookfield RVF, Spindle No. 7, 4 r.p.m., 20° C.).

Evaluation Of The Storage Stability Of The Emulsions

In order to reduce the test period, storage stability was evaluated under forced conditions at 80° C. This corresponds to a storage wear of 500 times that of storage at ambient temperature.

The viscosity of the emulsions was measured after 8, 16, and 24 hours of storage at 80° C.

TABLE 7

| | Change In Viscosity On Storage At 80° C. Brookfield RVF, Spindle No. 7, 4 r.p.m., 20° C., m Pa.s. | | | | | | |
|---|---|---|---|---|---|---|---|
| | | | | | | Comparison Example | |
| Example | 1 | 2 | 3 | 4 | 5 | A | B |
| Initial Value | 2450 | 2100 | 2000 | 2500 | 2400 | 2050 | 1750 |
| 8 h 80° C. | 2650 | 2100 | 2150 | 2350 | 2200 | 950 | 1100 |
| 16 h 80° C. | 2600 | 2250 | 2200 | 2400 | 2150 | 700 | 750 |
| 24 h 80° C. | 2250 | 2100 | 2000 | 2200 | 2150 | 500 | + |

+Emulsion has started to coagulate.

Evaluation of Pigmented Paints

Paints were prepared from the emulsions according to Examples 1 to 5 and Comparison Examples A and B, pigmented in a pigment/binder ratio of 1:1 with titanium dioxide, containing 3% (on resin solids) of a water-compatible siccative blend (consisting of 1.2% of cobalt, 7.2% of barium, and 3.2% of zinc), 1% of an anti-skinning agent, and 0.5% of flow agent. The paints were diluted to application viscosity with deionized water. The results are listed in Table 8.

TABLE 8

| | Evaluation Of The Paints | | | | | | |
|---|---|---|---|---|---|---|---|
| Example | 1 | 2 | 3 | 4 | 5 | A | B |
| Storage stability: | | | | | | | |
| (A) | LVA | i.O. | i.O. | LVA | i.O. | VA | VA |
| (B) | i.O. | i.O. | i.O. | i.O. | i.O. | LA | LA |
| (C) | — | — | — | — | — | REG | REG |
| Drying: | | | | | | | |
| Tackfree, hours | 2 | 1.5 | 2 | 2 | 2 | 1.5 | 8 |
| Touch-dry, hours | 6 | 6 | 8 | 8 | 6 | 6 | 24 |
| Pendulum hardness: | | | | | | | |
| 1 week (DIN 53154) | 58 | 65 | 49 | 41 | 55 | 62 | 38 |
| Water resistance: | | | | | | | |
| (A) | LE | LE | LE | E | LE | LE | SE |
| (B) | REG | = | = | = | = | = | RB,GM |
| (C) | mo/g0 | mo/g0 | ml/g1 | ml/g2 | mo/g0 | mo/g0 | ml/g2 |

Evaluation Of Storage Stability

In closed containers at 50° C. during 4 weeks; change in viscosity (A), settling tendency (B) and, optionally, the regenerating capacity (C).

Evaluation Of Drying Characteristics

24 Hours after the preparation of the paints they are applied to glass strips by means of doctor blades to give a dry film thickness of 30 μm and are then evaluated.

Evaluation Of Water Resistance

Evaluation is made after 24 hours of air drying by water soak of the paint films at 20° C. for 24 hours.

Key To Abbreviations

Storage stability:
(A) viscosity:
　VA: decline in viscosity
　LVA: slight decline in viscosity
　i.O.: no noticeable change
(B) settling tendency: LA: slight settling
(C) regeneration: REG: can be regenerated through addition of triethylamine, precipitate can be stirred in.

Water resistance:
(A) condition immediately after removal from soak water:
　LE: slight swelling
　E: swelling
　SE: severe swelling
(B) after 8 hours:
　REG: regenerated
　RB: wrinkles
　GM: reduced gloss
(C) blistering according to DIN 53 209

As will be apparent to one skilled in the art, various modifications can be made within the scope of the aforesaid description. Such modifications being within the ability of one skilled in the art form a part of the present invention and are embraced by the appended claims.

It is claimed:

1. Process for producing water-emulsifiable air drying paint binders based on modified alkyd resins having a fatty acid content of from 15 to 50% by weight and a polyethylene glycol content of from 3 to 8% and which are obtained through condensation of a polyethylene glycol with an average molecular weight of between 500 and 5000 and a low molecular alkyl- and/or arylphenol resol and an oil fatty acid ester with an iodine number of at least 125, and through reaction of the condensate with mono- and dicarboxylic acids and the normally used alcohol components, characterized in that—
(A) 50–92% by weight of a polyethyleneglycol-resol-modified alkyd resin intermediate with an acid value of below 15, an intrinsic viscosity of from 4 to 8 ml/g (chloroform/20° C.), and a hydroxyl number of from 50 to 250 mg KOH/g, and
(B) 8–50% by weight of a polymer, obtained through free radical polymerization at 80° to 140° C. of
　6–40% by weight of methacrylic acid,
　20–55% by weight of a drying oil fatty acid with an iodine number of at least 125 and
　20–70% by weight of one or more vinyl- and/or vinylidene compounds containing no other reactive groups other than the double bond,
are esterified at 170° to 200° C. to an acid value of from 10 to 30, and an intrinsic viscosity of from 8 to 12 ml/g (chloroform/20° C.).

2. Process according to claim 1 further characterized in that as the alkyd resin intermediates mixtures are used of two or more PEG-modified alkyd resin intermediates, or mixtures of PEG-modified alkyd resin intermediates with PEG-free alkyd resin intermediates.

3. Process according to claim 1 further characterized in that the acid value of the modified alkyd resin intermediate is below 5 mg KOH/g.

4. Process according to claim 1 further characterized in that said polymer is obtained through free radical polymerization at from 90° to 110° C.

5. Process according to claim 1 further characterized in that the vinyl- and/or vinylidene compounds are acrylic compounds.

6. Process according to claim 1 further characterized in that (A) and (B) are esterified to an acid value of from about 15 to 25 mg KOH/g.

7. Water-emulsifiable air drying paint binders based on modified alkyd resins having a fatty acid content of from 15 to 50% by weight and a polyethylene glycol content of from 3 to 8% obtained through condensation of a polyethylene glycol with an average molecular weight of between 500 and 5000 and a low molecular alkyl- and/or arylphenol resol and an oil fatty acid ester with an iodine number of at least 125, and through reaction of the condensate with mono- and dicarboxylic acids and the normally used alcohol components comprising the reaction product through heating at about 170° to 200° C. of (A) 50–92% by weight of a polyethyleneglycol-resol-modified alkyd resin intermediate with an acid value of below 15, an intrinsic viscosity of from 4 to 8 ml/g (chloroform/20° C.), and a hydroxyl number of from 50 to 250 mg KOH/g, and (B) 8–50% by weight of a polymer, obtained through free radical polymerization at 80° to 140° C. of 6–40% by weight of methacrylic acid, 20–55% by weight of a drying oil fatty acid with an iodine number of at least 125 and 20–70% by weight of one or more vinyl- and/or vinylidene compounds containing no other reactive groups other than the double bond, said binders having an acid value of from 10 to 30 and an intrinsic viscosity of from 8 to 12 ml/g (chloroform/20° C.).

8. The water-emulsifiable air drying paint binders of claim 7 wherein the said modified alkyd resin intermediate is a mixture of two or more PEG-modified alkyd resin intermediates.

9. The water-emulsifiable air drying paint binders of claim 7 wherein the said modified alkyd resin intermediate is a mixture of PEG-modified alkyd resin intermediates and PEG-free alkyd resin intermediates.

10. The water-emulsifiable air drying paint binders of claim 7 wherein said modified alkyd resin intermediate has an acid value below about 5 mg KOH/g.

11. The water-emulsifiable air drying paint binders of claim 7 wherein said vinyl- and/or vinylidene compound of (B) is an acrylic compound.

12. The water-emulsifiable air drying paint binders of claim 7 wherein said binder has an acid value of from about 15 to 25 mg KOH/g.

* * * * *